United States Patent
Choudha et al.

(10) Patent No.: US 11,979,426 B2
(45) Date of Patent: May 7, 2024

(54) PREDICTIVE VULNERABILITY MANAGEMENT ANALYTICS, ORCHESTRATION, AUTOMATION AND REMEDIATION PLATFORM FOR COMPUTER SYSTEMS. NETWORKS AND DEVICES

(71) Applicant: Hive Pro Inc., Milpitas, CA (US)

(72) Inventors: Anand Choudha, Katni (IN); Sarfaraz Kazi, Dubai (AE)

(73) Assignee: Hive Pro Inc., Milipitas, CA (US)

( * ) Notice: Subject to any disclaimer, the term of this patent is extended or adjusted under 35 U.S.C. 154(b) by 280 days.

(21) Appl. No.: 17/551,010

(22) Filed: Dec. 14, 2021

(65) Prior Publication Data
US 2022/0201031 A1      Jun. 23, 2022

Related U.S. Application Data (60) Provisional application No. 63/127,380, filed on Dec. 18, 2020.

(51) Int. Cl.
*H04L 9/40* (2022.01)

(52) U.S. Cl.
CPC ............... *H04L 63/1433* (2013.01)

(58) Field of Classification Search
CPC ............ H04L 63/1433; H04L 63/1425
See application file for complete search history.

(56) References Cited

U.S. PATENT DOCUMENTS

| | | | |
|---|---|---|---|
| 10,817,611 B1* | 10/2020 | Glynn | G06F 21/577 |
| 2013/0074188 A1* | 3/2013 | Giakouminakis | G06F 21/577 |
| | | | 726/25 |
| 2016/0012236 A1* | 1/2016 | Giakouminakis | G06F 21/577 |
| | | | 726/25 |
| 2016/0043881 A1* | 2/2016 | Forte | H04W 4/02 |
| | | | 370/254 |
| 2018/0034837 A1* | 2/2018 | Lakhani | H04L 63/1433 |

(Continued)

FOREIGN PATENT DOCUMENTS

| | | |
|---|---|---|
| JP | 5304243 | 1/2008 |
| JP | 5304243 | 10/2013 |

OTHER PUBLICATIONS

International Search Report and Written Opinion for Application No. PCT/US2021/063403, mailed on Apr. 8, 2022, 9 pages.

(Continued)

*Primary Examiner* — Vu V Tran
(74) *Attorney, Agent, or Firm* — Fish IP Law, LLP; Tomas A. Prieto (57) ABSTRACT

A system and method for predicting and acting on computer network vulnerabilities before they are actually breached or tampered with by malicious external actors. A monitoring computing device assesses the different components within a network and based on a ranking of the devices, a perceived threat analysis and weaknesses within the network, can take appropriate remediation actions for one or more of the devices within the network. Depending on the ranking of a particular computing device within the network and the determined risk, a remediation can include delaying the implementation of a fix for a weakness because the computing device cannot be taken offline at that particular time.

20 Claims, 2 Drawing Sheets

(56) References Cited

U.S. PATENT DOCUMENTS

| | | | |
|---|---|---|---|
| 2018/0137288 A1* | 5/2018 | Polyakov | G06F 21/552 |
| 2019/0238584 A1* | 8/2019 | Somasundaram | H04L 63/20 |
| 2019/0253450 A1* | 8/2019 | Ahuja | G06F 21/577 |
| 2020/0296127 A1 | 9/2020 | Mylavarapu et al. | |
| 2020/0394312 A1* | 12/2020 | Bhargav | G06F 21/564 |

OTHER PUBLICATIONS

International search report dated Mar. 8, 2022, for related PCT application No. PCT/US21/63403. 9 pages.

* cited by examiner

PREDICTIVE VULNERABILITY MANAGEMENT ANALYTICS, ORCHESTRATION, AUTOMATION AND REMEDIATION PLATFORM FOR COMPUTER SYSTEMS. NETWORKS AND DEVICES

This application claims priority to U.S. provisional application 63/127,380, filed Dec. 18, 2020. U.S. provisional application 63/127,380 and all other extrinsic references contained herein are incorporated by reference in their entirety.

FIELD OF THE INVENTION

The field of the invention is cybersystem security, and in particular, a risk-based vulnerability management platform for predictive analysis, orchestration, automation and remediation action through a single console, relative to security events on computing systems, networks and devices.

BACKGROUND

The background description includes information that may be useful in understanding the present invention. It is not an admission that any of the information provided herein is prior art or relevant to the presently claimed invention, or that any publication specifically or implicitly referenced is prior art.

Modern organizations of all kinds rely on computer systems, networks and devices for nearly all aspects of their existence. These systems are used to capture, process, store and/or transfer data (even critical or sensitive data), as well as to carry out vital computing processes to enable organizational operations of various kinds within a business. Given their critical importance relative to reliance on such computer systems, networks and devices of an organization, these are, factually considered a tempting target for those wishing to inflict harm, disruption, destruction, exploitation, to gain access or for varied other motives.

The cyber threat landscape is a collection of threats in a particular domain or context, with information on identified vulnerable assets, threats, risks, threat actors and observed trends. The cyber threat landscape is an ever-evolving landscape, making security and defense a primary priority against compromise of any computer systems, networks and devices. An organisation is required to adequately consider its threat posture, relative to vulnerability for attack or breaches of its computer systems, networks and devices; and adequately bolster its security posture, so as to increase its threat appetite and thereby, best position itself against (pre-attack), as well as at the onset of any cyber-attack.

As computer systems, networks and devices have grown in scope, complexity and sophistication, arduous and continuous attempts are made at ensuring that computer systems, networks and devices are best secured against threat and compromise, however, existing security solutions are lacking in a way that still leave exposed the computer systems, networks and devices they attempt to safeguard.

Existing solutions fail to account for proper computing systems, networks and devices asset identification, assessment, analysis, communication and remediation ("IAACR") practices, as part of a comprehensive vulnerability management process, throughout the vulnerability lifecycle of such computing systems, networks and devices, together with the data assets which they house, process, store, transfer and otherwise control. This vulnerability lifecycle, notably, is a continuous cycle consisting of different steps or tasks performed on various end points, products or tools within an organization's computing systems, networks and devices.

These existing solutions fail to address the true risk of comprehensive vulnerability mapping to an attack or attacker and presenting the possibility or even, the probability of an attack attributed to the vulnerability, either ongoing, or happened in the past or most likely to happen in future. Weaknesses, such as configuration errors or human deficiencies that can leave a computer network, system and devices used in such computing network environment susceptible to cyber-attack.

Existing solutions similarly only focus on addressing known and identified system vulnerabilities that can be patched or updated, provided that such patches or updates are available and in fact, implemented through a change-management process, which is more often than not, a manual process and tedious task, through scheduled roll outs of computing system changes, subject to management permissions and availability of system access.

Existing solutions similarly fail to account for the relative importance or criticality, through bespoke, individualist classification and prioritization of remediation of identified vulnerabilities and the management thereof, at that particular point in time of individual computers, systems, networks and device when implementing a remedy, or considering to do so, and if this is within the capability (with skills, tools and man-power considerations) of the organization through means of their existing resources, both technological (i.e. software) or its people, whom are responsible for this.

Existing solutions, even when conducting a data intelligence synchronization exercise of its assets, similarly fail to further aggregate historical data for ingestion and similarly, effectuate proper vulnerability management processes.

Thus, there is still a need for a comprehensive computer security system that can account for the various ways that a system can be breached and get attacked, and intelligently adapt to implement solutions appropriately with minimalized human intervention, relative to employing and deploying traditional monitoring and detection personnel and assistive technologies, as well as responsive and appropriate remediation solutions, as soon as it is necessitated through notification of possible exploit, suspicion or actual detection.

Further, there is a need for a defined, automated and managed series of tasks and processes for each phase of proper computing systems, networks and devices asset identification, assessment, analysis, communication and remediation (IAACR) practices to be performed expeditiously, automatically and in a synchronous manner, by means of a simplified, single console; and thus, establishing a Vulnerability Management process, uniquely with end-to-end vulnerability lifecycle automation and prioritization.

BRIEF DESCRIPTION OF THE DRAWINGS

The inventive subject matter provides apparatus, systems and methods in which one or more computing devices within a system can secure a network against vulnerabilities. To do so, a monitoring computing device (or devices) ingests information about the network, and then classifies computing devices in a network and monitors weakness points for each of the computing devices in the network. Based on this, the monitoring computing device ranks the computing devices in the network. The monitoring computing device then detects a first weakness within a computing device and detects a true risk based on internal and external threat factors. Having the first weakness and the true risk, as well as the ranking of the computing device carrying the first weakness, the monitoring computing device determines an appropriate remediation action and applies it.

In embodiments, the remediation action can include a patch or a fix. In some embodiments, the remediation action can include delaying an implementation of a fix for the first weakness of the computing device.

Contemplated weaknesses can include vulnerabilities and/or configuration defects. Vulnerabilities can include software vulnerabilities, virus definitions or known malware definitions, and can be weaponized or exploited vulnerabilities. Configuration defects can include things like a weak password, an outdated virus protection, an unprotected sector of memory, unencrypted data, etc.

In embodiments, the systems and method of the inventive subject matter can include a breach and attack simulation agent that can assist in discovering potential weak points in a network before they are attacked by a malicious agent.

DETAILED DESCRIPTION

It should be noted that any language, data or telemetry directed to or from a computer should be read to include any suitable combination of computing devices, including servers, interfaces, systems, databases, agents, peers, engines, controllers, Information of Things (IoT) devices or other types of computing devices, operating individually or collectively. One should appreciate the computing devices comprise a processor configured to execute software command instructions stored on a tangible, non-transitory computer readable storage medium (e.g., hard drive, solid state drive, RAM, flash, ROM, etc.). The software instructions preferably configure the computing device to provide the roles, responsibilities, or other functionality, as discussed below, with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or any other electronic information exchanging methods via computing devices. Data exchanges preferably are conducted over a data packet-switched network, the Internet, LAN, WAN, VPN, or other type of data packet switched network.

The following description includes information that may be useful in understanding the present invention. It is not an admission that any of the information provided herein is prior art or relevant to the presently claimed invention, or that any publication specifically or implicitly referenced is prior art.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
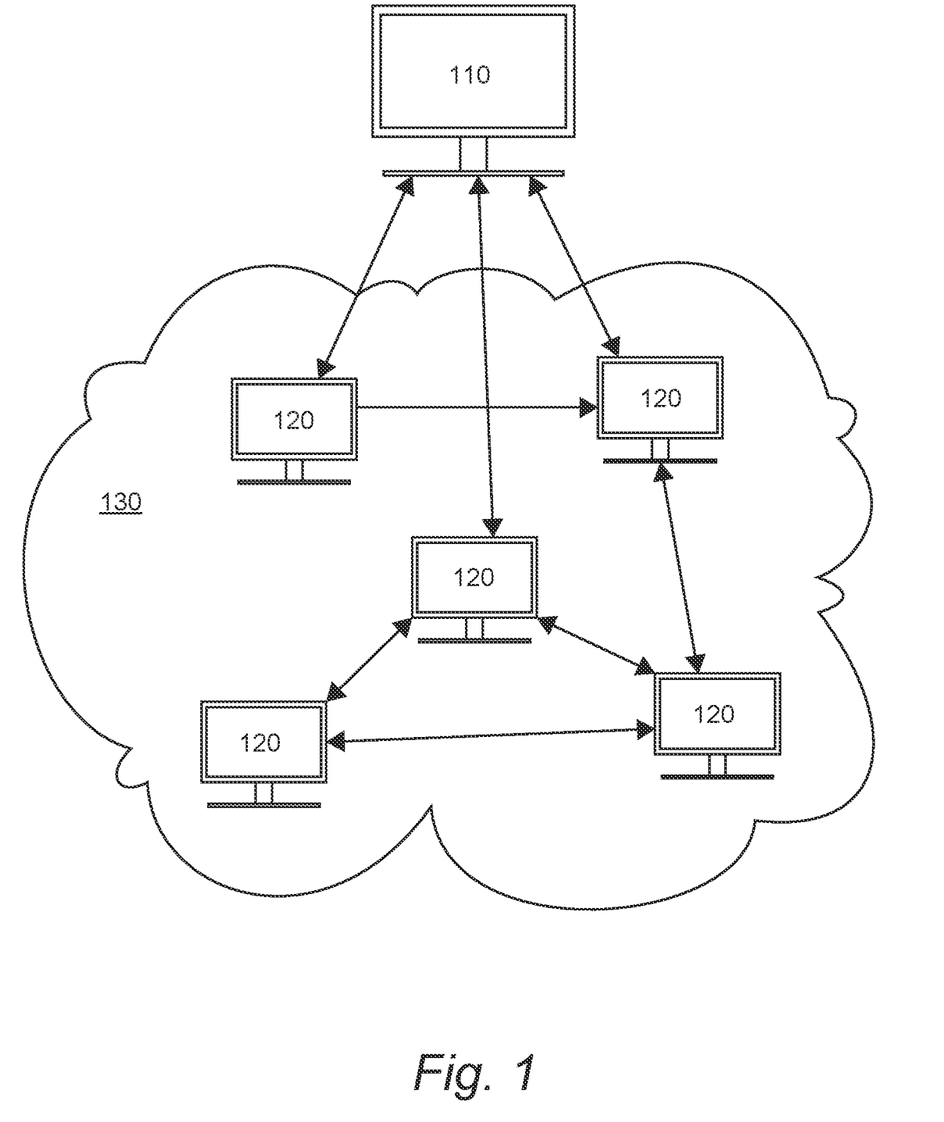
FIG. 1 is a diagrammatic overview of a system according to embodiments of the inventive subject matter.

FIG. 1 illustrates an overview of the systems of the inventive subject matter.

As seen in FIG. 1, the system 100 includes a monitoring computing device 110 and a plurality of computing devices 120 that are a part of a network 130. It is noted that the cloud shape of network 130 is not intended to limit the network 130 to a cloud network. Cloud networks as well as all other data-exchange networks are contemplated to be suitable for the inventive subject matter.

The monitoring computing device 110 can be a single computing device, or multiple computing devices, that host and enable the carrying out the functions of the inventive subject matter discussed herein. In embodiments of the inventive subject matter, the monitoring computing device 110 is a computer outside of the network 130 that is communicatively coupled with one or more of the computing devices 120 within the network 130. In other embodiments, the monitoring computing device 110 can be a member of the network 130 and, in a variation of these embodiments, be one of the computing devices 120 that is also programmed to carry out the processes of the monitoring computing device 110.

Computing devices 120 is intended to include all interconnected and programmable devices within the network 130, which could be an on-premise physical network, a cross-premises network, a virtual network, a sub-network or combination of these network systems. Thus, computing devices 120 generally will include a processor, non-transitory computer-readable memory that holds data and program instructions for the processor to execute, and one or more communication interfaces (e.g., wired or wireless communication interfaces) that allow the computing device to communicate with other computing devices within the network 130 and/or outside of the network 130. As such, computing devices 120 can include computers that the users of an organization use (e.g., desktop computers, laptop computers, server computers, tablets, smartphones, gaming consoles, etc.), networking devices within the network 130 (e.g., routers, hubs, modems, repeaters, etc.), and other machinery connected to the network 130 that can execute programmable instructions as part of their functions (e.g., manufacturing machinery, laboratory equipment, medical devices, photocopiers, fax machines, etc.).

The network 130 can be a network belonging to an organization (e.g., a corporation, etc.).

At the initial system setup, the monitoring computing device 110 is programmed to scan and discover the computing devices 120 in network 130, as well as prepare the customers' infrastructure for vulnerability management by ingesting all relevant information about the organization and its infrastructure, classifying it as per the customers' requirements and industry best practices and configuring the systems for IAACR, as a crutial part of the Identification phase of the Vulnerability Management Process following the IAACR protocol. For example, at the system setup, the monitoring computing device 110 can discover the IT assets for an organization for the purposes of assessing vulnerability and priority.

In embodiments of the inventive subject matter, the scan and discovery can involve scanning for identifiers within the network. This can include scanning and discovering device IDs of the devices in the network, IDs associated with software or processes, IP addresses, user IDs of users using the network, and other identifiers.

In embodiments, the discovery process can be performed continually by the monitoring computing device 110 after the initial setup. In other embodiments, the discovery process can be periodically performed by the monitoring computing device 110 after initial setup. This way, as computing devices are added or removed from the network 130, the system 100 can be updated to account for these changes.

In embodiments, the scanning and discovery process can include integration with existing Asset Management solutions (Axonius, ServiceNow CMDB, Manage Engine, Ivanti, etc.) of the monitoring computing device 110, already operating for the network 130 and ingesting information about the computing devices 120 in the network 130 (e.g., IP addresses, host names, asset owners, business services, department identification, etc.). By integrating these solutions, the monitoring computing device 110 can incorporate and ingest all existing vulnerability data and information that may already have been identified in the solution repositories/databases.

In embodiments, the initial discovery phase can include an intelligence synchronization with a security system network or cloud. The security system can provide the monitoring computing device 110 with one or more of the following data items: threat and vulnerability intelligence feeds (JSON), threat actor data, mitre ATT&CK TTPs, threat advisories, policy files (in XML) for vulnerability scanners, BAS attack metadata, asset classification rules, and patch intelligence data.

In embodiments of the inventive subject matter, the monitoring computing device 110 executes a historical data ingestion process after the intelligence synchronization. The historical data ingestion can be from the system's existing security solutions. For example, data can be ingested from a vulnerability scanner, an asset management system, and/or a patch management system. For each of these systems the types of data ingested can be as follows:

The data ingested from a vulnerability scanner can include asset data (asset ID, IP address, hostname, MAC, OS, installed software, services running, CPE, etc.), vulnerability data (CVE, name, description, scanner severity, CPE, target asset, CVSS, exploitability, last scan date, etc.), or misconfiguration data (name, target asset, compliance status, last scan date).

Data ingested form an asset management system can include asset ID, IP address, hostname, MAC, OS, installed software, services running, CPE, risk, location, description, owner and/or serial number.

Data ingested from a patch management system can include asset data (IP address, hostname, status) and patch data (patch ID, download status, deployment status, etc.).

Figure 2:
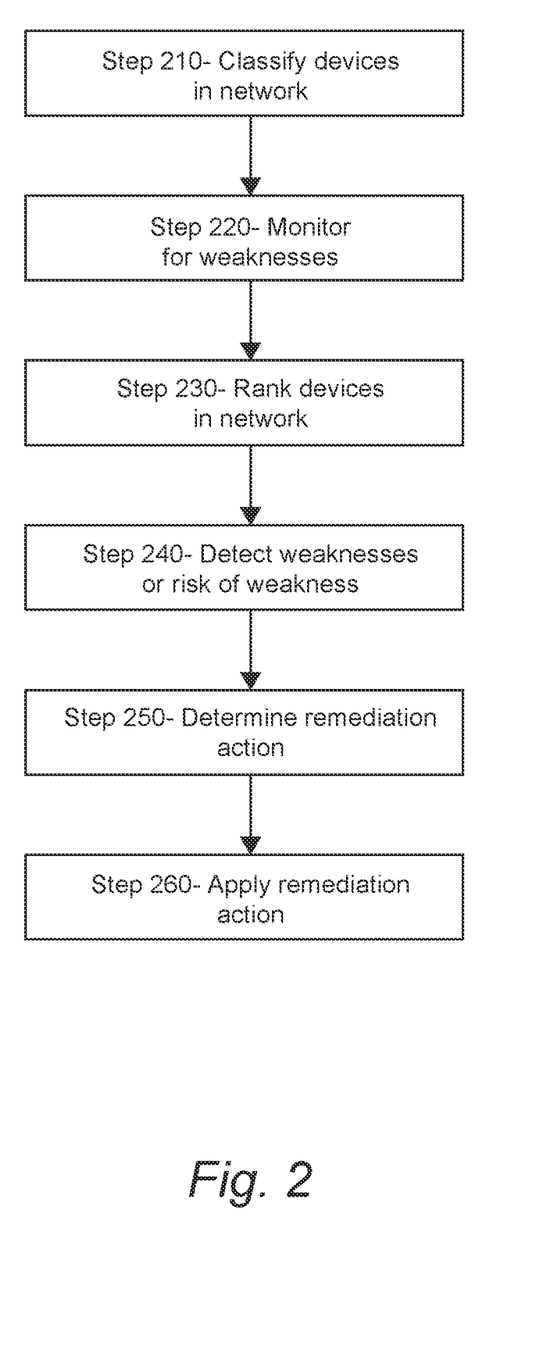
FIG. 2 is a flowchart of processes according to embodiments of the inventive subject matter.

FIG. 2 is a flowchart depicting the processes executed by the monitoring computing device 110, according to embodiments of the inventive subject matter. The overall process discussed herein includes improvements for Vulnerability Orchestration, Automation and Response ("VOAR") systems.

At step 210, the monitoring computer device 110 scans, identifies, and classifies each of a plurality of computing devices and assets of the system environment of 130, within the network. This could generally considered to be the "identification" phase of the process. In embodiments, this step overlaps with the initial discovery process. In other embodiments, this step follow the discovery step wherein the discovery step involves integration with prior systems as discussed above.

The classification process is as follows:

The monitoring computer device 110 first scans, identifies, and then categorizes each computing device 120 in the network 130 as belonging to one or more of the following categories:

Network subnets/IP Ranges/zones; Departments; Operating systems; servers; desktops/laptops; network devices; outdated/depreciated software versions; internet-facing devices; web servers, database servers; application servers; file servers; business-critical devices/subnets; first observed in last 7 days (i.e., a new device that was first detected within the network in the last 7 days); not observed for 30 days (i.e., a device that had been previously silent for the last 30 days); miscellaneous (e.g., printers, CCTV, IP phones, etc.); and security devices.

In addition to the above, the monitoring computing device 110 assesses the criticality of the asset categories identified, classifying same in levels of low to high, for each computing device 120 and assigns it a bespoke criticality risk score, followed by validating this criticality risk score with the operator of the network.

The criticality risk scoring of asset categories identified within or of a computing device 120 in the network 130 can refer to the relative importance of the computing device 120 to the functions of the collective network 130 and/or within an organization, innately relative to the organization, in relation to the identified assets. For example, a computing device 120 that handles a critical step in an overall process involving multiple devices in the network 130 would have a relatively high criticality risk scoring level. Within an organization, a critical piece of infrastructure or the computing device of a critical member would similarly have a high criticality level.

At this step or after this step, the monitoring computing device 110 creates relevant policies and scans for host discovery, vulnerability assessment, configuration audits, etc., and can schedule the scans according to operator requirements and available scanning time periods, in embodiments of the inventive subject matter.

After creating scans, the monitoring computing device 110 identifies vulnerability exposure and vulnerability risks to the asset and determine probability of breach to an asset (i.e., a computing device 120 in network 130) owing to vulnerability and attributes such vulnerability to an attacker or an attack. Not only taking into consideration the risk possessed by the vulnerability but also, in assessing what the actual chance (probability or possibility) of a vulnerability getting exploited by simulating the attacks associated with it and checking current mechanisms against list of attackers' tactics, techniques and procedures associated with such attacker(s), and contextualizing the attacker possibility and/or probability to all assets, and ranking which assets need to be prioritized for vulnerability patching.

At this step or after this step, the monitoring computing device 110 can integrate with incident and/or change management solutions and define or absorb communication workflows according to individualist operator (e.g., organizational) requirements, in embodiments of the inventive subject matter.

At this step or after this step, the monitoring computing device 110 can define service levels and KPIs based on individualist operator requirements and establish a monitoring process and mechanism accordingly so as to effectuate this, in embodiments of the inventive subject matter.

At this step or after this step, the monitoring computing device 110 can integrate with existing patch management solutions and ingest details about assets integrated with or associated with the patch management solutions, in embodiments of the inventive subject matter.

At this step or after this step, the monitoring computing device 110 can integrate with configuration management solutions and ingest details about configuration standards, assets, etc., in embodiments of the inventive subject matter.

At step 220, the monitoring computer device 110 monitors each of the computing devices 120 for a plurality of weakness points. This step could be referred to as the assessment phase. This step focuses on the current state of the computing devices 120 within the network 130.

A weakness point generally refers to deficiency in an aspect of security of a computing device 120 that could increase the of a successful attack on or exploit of the computing device 120, potentially exposing the computing device 120 and other devices on the network to outside intrusion.

In embodiments, the weakness points can include vulnerabilities and/or configuration defects.

Vulnerabilities are considered to be weaknesses that can be addressed by the deployment of a patch, update, or new software to a computing device. Examples of vulnerabilities can include outdated software, outdated antivirus protection, corrupted files, disabled firewalls, known software vulnerabilities, known virus definitions, known malware definitions, etc.

Configuration defects are considered to be weaknesses other than those addressed by the deployment of a patch, update or new software to a computing device. Examples of configuration defects can include weak passwords, disabled passwords, disabled antivirus software, unencrypted files, an unprotected area of memory, etc.

Thus, at step 220 the monitoring computing device 110 performs scans for known vulnerabilities and for known configuration defects using existing vulnerability management solutions. This can include scanning for compliance with established security protocols and regulations.

As a part of this step or after this step, the monitoring computing device 110 runs discovery scans on the computing devices 120 and performs a validation for each device 120, according to embodiments of the inventive subject matter. The monitoring computing device 110 can update the groupings/categories of computing devices 120 accordingly if it had previously created these categories. In variations of the inventive subject matter, the monitoring computing device 110 also performs a scan to identify obsolete and/or outdated computing devices 120 that are still part of network 130.

As a part of this step, the monitoring computing device 110 also scans each computing device 120 to detect the software and/or services operating on each of the devices 120, according to embodiments of the inventive subject matter.

As it performs scans for configuration defects, the monitoring computing device 110 can identify and group computing devices 120 having common configuration defects.

As it performs scans for vulnerabilities, the monitoring computing device 110 can identify computing devices 120 that have not been patched or updated in a predetermined amount of time (e.g., 3 months).

As a part of this step, the monitoring computing device 110 can identify new computing devices 120 (e.g., computing devices 120 that were not previously detected) as well as identify computing devices 120 that it had previously identified as being in network 130 but that are no longer detected in the scan.

As a part of this step, the monitoring computing device 110 can correlate malware scan results, threat intelligence, weakness analysis (vulnerability and/or configuration defects), logs, etc. to predict threats, risk of specific attacks, specific actors, etc.

At step 230, the monitoring computing device 110 ranks each of the computing devices based on the classification of step 210 and the weakness points for each of the computing devices monitored at step 220.

The ranking can be on the risk score that is determined by the computing device 110 based on a correlation between the classification and the identified weakness points of the computing devices.

In embodiments of the inventive subject matter, the monitoring computing device 110 can contextualize the computing devices 120 according to an organization's requirements (e.g., business requirements, operational requirements, etc.) For example, for a banking organization, a system running core banking operations is likely to have the highest priority and also risk. In another example, for telecom organizations, billing and CRM systems are likely to have the highest priority and risk. The monitoring computing device 110 also contextualizes with external factors like geography and which attack or attacker are operating or intending to attack the organization, contextualize the Threat, Tactics and Procedures (TTP) map the Vulnerability used by the attack or attacker and present to the organization the possibility of an attack attributed to the attack or attacker.

In embodiments of the inventive subject matter, the monitoring computing device 110 can reclassify the computing devices 120 based on the software/services running on the device.

The risk score for the overall system can be determined based on a vulnerability risk score and a configuration defect risk score.

As a part of this step, the monitoring computing device 110 can categorize identified vulnerabilities as weaponized vulnerabilities or exploited vulnerabilities, according to embodiments of the inventive subject matter. Weaponized vulnerabilities are vulnerabilities which have a known exploit available in the market. Exploited vulnerabilities are vulnerabilities that are known to have been exploited. The exploits can be exploited within an organization's industry, within a certain geographic region, for a particular type of computing device, etc. The exploits can, but are not required to, include a computing device 120 from the network 130.

As a part of this step, the monitoring computing device 110 can categorize identified weaknesses based on parameters such as severity, computing device(s) potentially affected, threat to the computing devices and network as a whole, determined risk, or other parameters.

In embodiments of the inventive subject matter, the monitoring computing device 110 can compute a vulnerability risk distribution and/or a configuration defect risk distribution at a focused level, such as based on departments within an organization, network subnets, and/or physical site locations.

In embodiments, the monitoring computing device 110 can identify trends of detected weaknesses and identified computing devices 120.

In embodiments, the monitoring computing device 110 can identify patterns in vulnerability and misconfiguration to predict the root cause. For example, every new windows system provisioned has common vulnerabilities and misconfiguration. This may imply that the base image used to provision windows systems has open issues, if that is fixed, all new servers would be free from known issues.

At step 240, the monitoring computing device detects a risk of a weakness within one of the computing devices in the network. This can include a presence of a weakness within the computing device or a sufficiently high risk that a weakness will occur. This can be based on the categorization of the weaknesses and the assessments (detected configurations based on scan, rank based in part on the computing device's roles or functions within the network, etc.).

In embodiments, the risk of the weakness can be based on a function that applies the categorization of the weakness as scaling factor to the assessments. Each factor in the assessments (the detected configurations, rank, etc.) can be scaled by the weakness based on an a priori weighting that reflects the vulnerability of the particular factor to the particular weakness.

As a part of step 240, the monitoring computing device can then determine a true risk for the network based on one or more internal threat factors and external threat factors. The internal threat factors are those that originate within the network, such as within a computing device within the network, within a process or application used within the network, or from an authorized user of the network. This can include applicable configuration defects or vulnerability defects that are discussed herein. External threat factors are those that come from outside the network, and can include known virus and/or malware definitions, known system exploits (such as day zero exploits), individuals known to be hackers or intruders, local internet infrastructure vulnerabilities (for the physical geographic area of one or more of the devices of the network, etc.). The internal and/or external threat factors can include potential actors or potential attacks against a computing device within the network. These actors or attacks could be internal if it is a person or an attack that can initially legitimately access the computing device and therefore the network to deploy the attack (e.g., an "insider").

At step 250, the monitoring computing device 110 determines a remediation action based on the detected risk of weakness, the calculated true risk, and the ranking of the computing device. In embodiments, step 250 includes the monitoring computing device 110 classifying vulnerability results into patch installation and configuration change for remediation.

In embodiments, step 250 can also include the monitoring computing device 110 executing a correlation of vulnerability data with patches available on patch management solution to identify applicable patches. In embodiments, the monitoring computing device 110 can correlate malware scan results, threat intelligence, vulnerability intelligence, logs, etc. with vulnerability data to predict threats, attacks, and actors Additionally, in embodiments, the monitoring computing device 110 can provide hindsight, insight and foresight to the network threat landscape based on the results of descriptive, diagnostic, predictive and prescriptive analytics.

At step 260, the monitoring computing device applies the appropriate remediation action. Steps 230-240 can be considered to be the analysis phase. Steps 250-260 can be considered the remediation phase.

In embodiments, the appropriate remediation action is immediately implementing a fix. For example, if the computer device 120 can be taken offline because of its relative role in the network or organization (based on its ranking), it is immediately addressed.

In embodiments, the appropriate remediation action is delaying the implementation of a fix for the identified weakness for the computing device. For example, if a computing device 120 performs functions critical to the network 130 or to the organization, then the monitoring computing device 110 delays the implementation of the fix until the device's presence in the network 130 is no longer critically required (e.g., a downtime in the schedule, until a workaround can be implemented, etc.)

In embodiments, the appropriate remediation action includes isolating the computing device having the identified weakness from the others in the network.

In embodiments, the remediation action includes transferring one or more functions from the computing device having the identified weakness to another computing device within the network. Upon transferring these functions, a fix can be applied to the identified weakness of the computing device. This can include taking this computing device offline or off of the network to apply the fix.

For detected vulnerabilities, the fixes can include patches identified for a particular vulnerability. For detected configuration defects, the monitoring computing device 110 can run scripts to effect the appropriate configuration changes. For example, the scripts can be programmed to enable or change operating system settings, security software settings, prompt a user for a new/better password, change lock screen settings, etc.

In embodiments of the inventive subject matter, the monitoring computing device 110 can identify patterns in vulnerabilities and misconfigurations (configuration defects) and determine a root cause. For example, if every new device having a particular operating system has a common vulnerability and/or configuration defect, the monitoring computing device 110 can infer that the base image used to provision the operating system has open issues. Accordingly, if that base image were fixed, this would solve the issue for all future computing devices 120 used in the network 130.

As a part of the remediation action, the monitoring computing device 110 can also continue to monitor the computing devices 120 where remediation (e.g., patches or configuration changes) were rolled out to determine the effectiveness.

Throughout the processes discussed herein, the monitoring computing device 110 also affects communications to the relevant operators (e.g., corresponding members of the organization). This can include sending alerts based on detected events, implemented solutions and other triggers. This can include generating and sending reports based on the assessments, analysis, and actions taken by the monitoring computing device 110. In embodiments, certain actions may require approval by the operator and in these embodiments the monitoring computing device 110 can request and obtain approval to proceed. The communications can be considered to be the communications phase. The communication phase can be ongoing concurrent with other phases and/or occur between phases.

The communication can, in embodiments, include prompts for manual action such as requesting a new password from a user, requesting an action that cannot be implemented by the computing device (such as a manual powering on/off of a device, a manual connection/disconnection, etc.).

After initial setup and deployment, the systems and methods of the inventive subject matter can continually or periodically execute the processes discussed related to FIG. 2 to provide ongoing protection for the network.

In embodiments of the inventive subject matter, the system can be programmed to include breach and attack simulation ("BAS") functionality. This can help a system better prepare for an eventual real attack by simulating an external attack. This way, the system and its operators can identify areas of weakness and address them before they are exploited in a real attack.

In these embodiments, a BAS software agent is programmed to perform the following:

First, the BAS software agent performs reconnaissance activities in the network to identify active network components. Active network components can refer to components utilizing the network such as devices, services, processes, users, etc. Some examples can include computing devices using the network, live hosts within the network, services currently running on or otherwise using the network, users logged into the network, etc.

The BAS software agent then obtains access to a host and performs privilege escalations.

The BAS software agent is programmed to, as it executes the process, evade defense systems such that it remains undetected within the system. In embodiments, the BAS software agent is programmed to mimic known ways that intruders conceal their presence.

As part of the breach and attach simulation, the BAS software agent is programmed to execute one or more of the following processes:

Remain and persist with access to one or more systems within the network, remaining undetected.

Extract information such as usernames, passwords, file system details, registry keys, and other sensitive information.

Laterally move within the network to infiltrate one or more of the systems using the network.

Modify existing resources on the systems such as files, registry keys, user accounts, etc.

Manipulate or interrupt running services or processes.

Deliver malicious payload in encrypted and encoded format in accordance with industry standard algorithms.

As the BAS software agent is performing these actions, it also logs the actions it takes such that they can be reversed when the simulation has concluded.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for securing a network against vulnerabilities, comprising:
    classifying, by a monitoring computing device, each of a plurality of computing devices in a network;
    monitoring, by the monitoring computing device, each of a plurality of weakness points for the plurality of computing devices;
    ranking, by the monitoring computing device, the plurality of computing devices based on the classification and the monitored plurality of weakness points;
    detecting, by the monitoring computing device, a first weakness within a first computing device from the plurality of computing devices;
    determining, by the monitoring computing device, a true risk by calculating a plurality of external and internal threat factors;
    determining, by the monitoring computing device, a remediation action based on the detected first weakness, the true risk, and the ranking of the first computing device; and applying, by the monitoring computing device, the remediation action, wherein the remediation action comprises delaying an implementation of a fix for the first weakness on the first computing device.

2. The method of claim 1, wherein the weakness points comprise at least one vulnerability and at least one configuration defect.

3. The method of claim 2, wherein the at least one configuration defect comprises at least one of a weak password, an outdated virus protection, an unprotected area of memory, and unencrypted data.

4. The method of claim 2, wherein at least one vulnerability comprises at least one of a known software vulnerability, a known virus definition, a known malware definition.

5. The method of claim 4, wherein the at least vulnerability comprises at least one of a weaponized vulnerability or an exploited vulnerability.

6. The method of claim 5, wherein the at least one of the weaponized vulnerability or the exploited vulnerability comprises an identified likely attack or identified likely actor against the first computing device.

7. The method of claim 5, further comprising:
periodically, by the monitoring computing device, assessing at least one exploited vulnerability for a geographic area, wherein the geographic area includes the first computing device.

8. The method of claim 1, wherein the remediation action further comprises isolating the first computing device within the network.

9. The method of claim 1, further comprising, prior to the step of classifying:
discovering, by the monitoring computing device, each of the plurality of computing devices in the network.

10. The method of claim 1, wherein the step of monitoring further comprises:
scanning, by the monitoring computing device, each of the plurality of computing devices for existing weakness points; and
determining, by the monitoring computing device and for each of the plurality of computing devices, a risk for exposure based on detected existing weakness points;
wherein the ranking step is performed based on the classification and the determined risk for each of the plurality of computing devices.

11. The method of claim 1, wherein the plurality of internal and external threat factors include potential actors or potential attacks against the first computing device.

12. A method for securing a network against vulnerabilities, comprising:
classifying, by a monitoring computing device, each of a plurality of computing devices in a network;
monitoring, by the monitoring computing device, each of a plurality of weakness points for the plurality of computing devices;
ranking, by the monitoring computing device, the plurality of computing devices based on the classification and the monitored plurality of weakness points;
detecting, by the monitoring computing device, a first weakness within a first computing device from the plurality of computing devices;
determining, by the monitoring computing device, a true risk by calculating a plurality of external and internal threat factors;
determining, by the monitoring computing device, a remediation action based on the detected first weakness, the true risk, and the ranking of the first computing device; and
applying, by the monitoring computing device, the remediation action, wherein the remediation action comprises:
transferring at least one function from the first computing device to a second computing device; and
applying a fix to the first computing device to address the first weakness.

13. The method of claim 12, wherein the weakness points comprise at least one vulnerability and at least one configuration defect.

14. The method of claim 13, wherein the at least one configuration defect comprises at least one of a weak password, an outdated virus protection, an unprotected area of memory, and unencrypted data.

15. The method of claim 13, wherein at least one vulnerability comprises at least one of a known software vulnerability, a known virus definition, a known malware definition.

16. The method of claim 15, wherein the at least vulnerability comprises at least one of a weaponized vulnerability or an exploited vulnerability.

17. The method of claim 16, wherein the at least one of the weaponized vulnerability or the exploited vulnerability comprises an identified likely attack or identified likely actor against the first computing device.

18. The method of claim 16, further comprising:
periodically, by the monitoring computing device, assessing at least one exploited vulnerability for a geographic area, wherein the geographic area includes the first computing device.

19. The method of claim 12, wherein the step of monitoring further comprises:
scanning, by the monitoring computing device, each of the plurality of computing devices for existing weakness points; and
determining, by the monitoring computing device and for each of the plurality of computing devices, a risk for exposure based on detected existing weakness points;
wherein the ranking step is performed based on the classification and the determined risk for each of the plurality of computing devices.

20. The method of claim 12, wherein the plurality of internal and external threat factors include potential actors or potential attacks against the first computing device.

* * * * *